US009154576B2

(12) United States Patent
Olabinri et al.

(10) Patent No.: US 9,154,576 B2
(45) Date of Patent: Oct. 6, 2015

(54) SYSTEM AND PROCESS FOR COMMUNICATING BETWEEN TWO VEHICLES

(71) Applicants: Babatunde O. O. Olabinri, Bucharest (RO); Barbara M. Cantacuzino, New Milford, CT (US)

(72) Inventors: Babatunde O. O. Olabinri, Bucharest (RO); Barbara M. Cantacuzino, New Milford, CT (US)

( * ) Notice: Subject to any disclaimer, the term of this patent is extended or adjusted under 35 U.S.C. 154(b) by 232 days.

(21) Appl. No.: 13/838,679

(22) Filed: Mar. 15, 2013

(65) Prior Publication Data

US 2013/0332528 A1    Dec. 12, 2013

Related U.S. Application Data

(60) Provisional application No. 61/656,067, filed on Jun. 6, 2012.

(51) Int. Cl.
*H04L 29/08* (2006.01)

(52) U.S. Cl.
CPC .................................. *H04L 67/306* (2013.01)

(58) Field of Classification Search
USPC ......................................... 709/204, 201, 208
See application file for complete search history.

(56) References Cited

U.S. PATENT DOCUMENTS

| 6,317,686 | B1 | 11/2001 | Ran |
| 7,552,009 | B2 | 6/2009 | Nelson |
| 7,646,296 | B2 | 1/2010 | Ohki |
| 8,102,281 | B2 | 1/2012 | Ohki |
| 8,112,061 | B2 | 2/2012 | Bolin |
| 8,193,950 | B2 | 6/2012 | Ohki |
| 8,270,940 | B2 | 9/2012 | Bolin |
| 2001/0032240 | A1* | 10/2001 | Malone et al. ................ 709/203 |
| 2002/0116366 | A1* | 8/2002 | Magouirk et al. ................ 707/1 |
| 2002/0166119 | A1* | 11/2002 | Cristofalo ........................ 725/34 |
| 2003/0074234 | A1* | 4/2003 | Stasny .............................. 705/4 |
| 2003/0081742 | A1* | 5/2003 | Czyszczewski et al. ... 379/93.03 |
| 2004/0023645 | A1 | 2/2004 | Olsen et al. |
| 2005/0221821 | A1 | 10/2005 | Sokola et al. |
| 2005/0222754 | A1 | 10/2005 | Meisler et al. |
| 2006/0036748 | A1* | 2/2006 | Nusbaum et al. ............. 709/228 |
| 2006/0161315 | A1 | 7/2006 | Lewis et al. |
| 2007/0033084 | A1* | 2/2007 | Mascarenhas ..................... 705/7 |
| 2007/0135978 | A1* | 6/2007 | Kim et al. ........................ 701/29 |
| 2008/0222127 | A1* | 9/2008 | Bergin ............................. 707/5 |
| 2009/0024272 | A1* | 1/2009 | Rogers et al. .................. 701/33 |
| 2010/0070875 | A1 | 3/2010 | Turski et al. |

(Continued)

FOREIGN PATENT DOCUMENTS

CN            202486664 U    10/2012
WO        2006/129967 A1    12/2006

OTHER PUBLICATIONS

International Search Report of PCT/US2013/062775, mailed Jan. 23, 2014.

(Continued)

*Primary Examiner* — Jude Jean Gilles
(74) *Attorney, Agent, or Firm* — Collard & Roe, P.C.

(57) ABSTRACT

A system and process for communicating between at least two different objects, such as vehicles is disclosed. The system can include a portable communication device, as well as a central communication server. This system can also include a plurality of databases which are disposed on or in communication with the servers. The databases can include a plurality of tables with the tables being used to monitor the activities and track the habits of the objects.

21 Claims, 15 Drawing Sheets

(56) References Cited

U.S. PATENT DOCUMENTS

| | | |
|---|---|---|
| 2010/0070881 A1* | 3/2010 | Hanson et al. ............... 715/753 |
| 2010/0203864 A1 | 8/2010 | Howard |
| 2010/0317371 A1 | 12/2010 | Westerinen et al. |
| 2011/0078105 A1 | 3/2011 | Wallace |
| 2011/0125365 A1 | 5/2011 | Larschan et al. |
| 2011/0246512 A1* | 10/2011 | Lubarski et al. ............ 707/769 |
| 2011/0269437 A1* | 11/2011 | Marusi et al. ............ 455/414.1 |
| 2011/0273279 A1 | 11/2011 | Vandivier et al. |
| 2012/0054054 A1 | 3/2012 | Kameyama |
| 2012/0287295 A1 | 11/2012 | Oota |
| 2012/0323474 A1 | 12/2012 | Breed et al. |
| 2013/0024060 A1 | 1/2013 | Sukkarié et al. |
| 2013/0144727 A1* | 6/2013 | Morot-Gaudry et al. .. 705/14.72 |
| 2013/0218902 A1* | 8/2013 | Vendrow et al. ............ 707/748 |

OTHER PUBLICATIONS

Written Opinion of the International Search Authority of PCT/US2013/062775, mailed Jan. 23, 2014.

* cited by examiner

FIG. 3

| Graphical | Street Names | Maps of States | Maps of Counties | Towns | Villages | Countries | Roads |
|---|---|---|---|---|---|---|---|
| | | | | | | | |

| | |
|---|---|
| | 92a |
| | 92b |
| | 92c |
| | 92d |
| | 92e |
| | 92f |
| | 92g |
| | 92h |
| | 92i |
| | 92j |
| | 92k |
| | 92l |
| | 92m |
| | 92n |
| 92p | 92o |

| 202 Picture | 204 Demographic Information |
|---|---|
| 206 Contact Information | 208 Personality Profile |
| 210 Future Acts | |

SYSTEM AND PROCESS FOR COMMUNICATING BETWEEN TWO VEHICLES

CROSS-REFERENCE TO RELATED APPLICATIONS

This application is a non-provisional application that claims priority under 35 U.S.C. 119e from U.S. Provisional Patent Application Ser. No. 61/656,067 filed on Jun. 6, 2012, the disclosure of which is hereby incorporated herein by reference in its entirety.

BACKGROUND OF THE INVENTION

The invention relates to a system and process for communicating between at least two different vehicles. The system can include a portable communication device, as well as a central communication server. This system can also include a plurality of databases which are disposed on or in communication with the servers.

SUMMARY OF THE INVENTION

The invention relates to a system and process for communicating between at least two different vehicles. The system can include a portable communication device, as well as a central communication server. This system can also include a plurality of databases which are disposed on or in communication with the servers. The databases can include a plurality of tables with the tables being used to provide a past history about the objects, demographic information about the objects as well as to predict future activities and movements of the object.

Thus, there can be a computerized process for communicating with at least one non-living object comprising at least the first step of enrolling at least one object in a communication system. Next, the process can include providing contact information for the object by uploading this contact information into a database. Next, the process can include obtaining a set of past history information of the object by uploading data from the object into the database. This past information can be location information, travel information, activity information, etc. Next, the process can also include the step of obtaining demographic information about the object and storing this demographic information in at least one database. This demographic information can include the name of the object, the sex of the object, the contact information of the object, the friends of the object, the birthdate of the object, the birthplace of the object, the moods of the object etc. Next, another step can include the step of creating a personality profile based upon the past history of the object. This personality profile can be presented on a screen for viewing and is now configured for allowing other users to communicate with this object. Thus, the system allows for the creation of a personality and contact information for a non-living object so that living users can form both a communication platform with these non living objects as well as a relationship with these non-living objects.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 3 is another table for the database; and

DETAILED DESCRIPTION OF PREFERRED EMBODIMENTS

Figure 1:
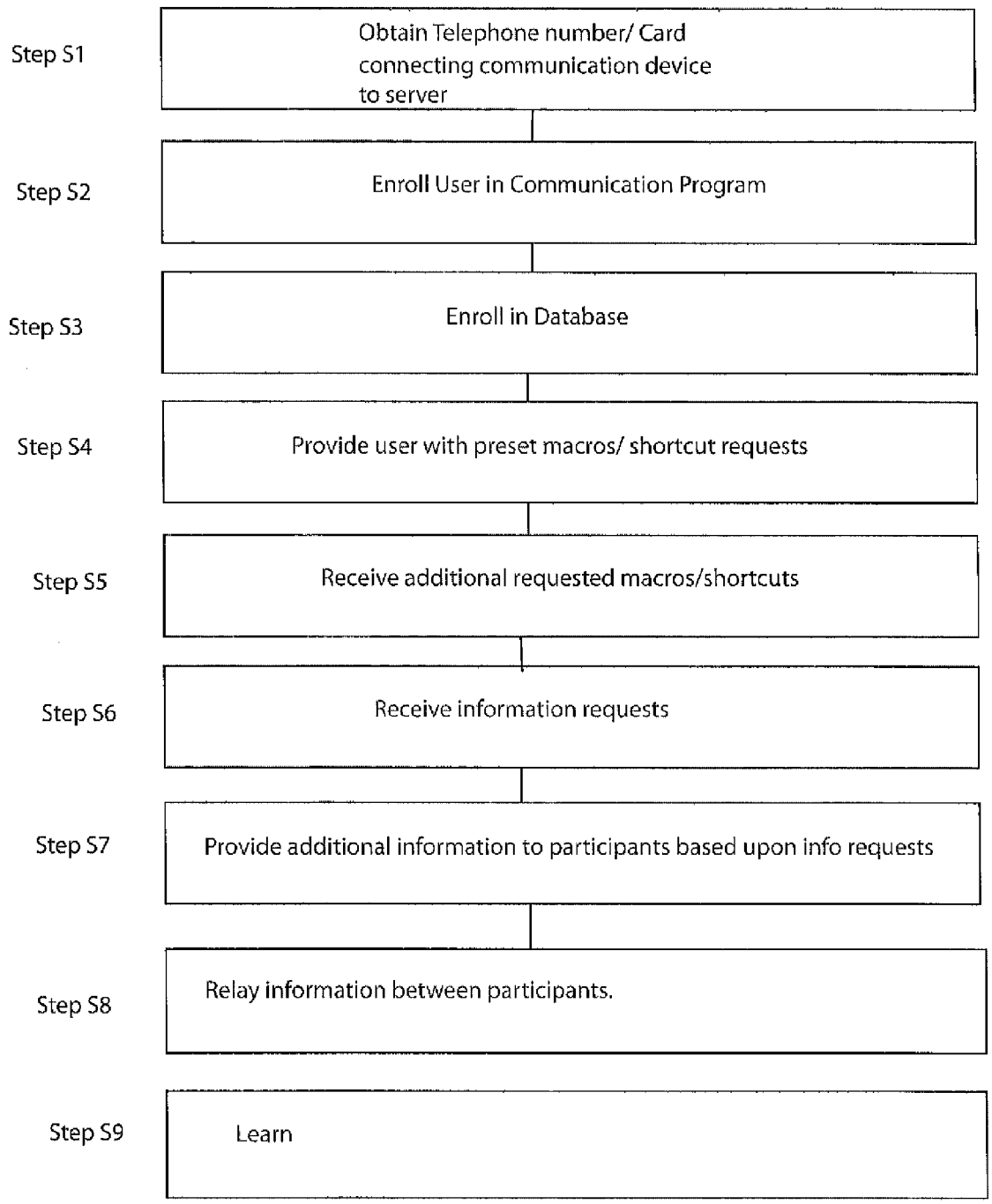
FIG. 1 is a flow chart for the process for registering a user and communicating between these two users.

Referring to the drawings, FIG. 1 is a flow chart for registering a user. This flow chart includes the step S1 which is that of obtaining a telephone number or SIM card or similar card serving to connect a communication device to a server for use from a telephone provider. Next, step S2 involves enrolling a user in a communication program. This step includes registering that user in the communication program. The user would then sign up for a communication plan and have the phone number registered to that user. Next in step S3, the user enrolls in the database such that the user fills out a questionnaire to register the preferences of the user in the program. The enrollment of the user in the database provides the user in step S4 with a plurality of pre-set macros which the user can use to communicate with other users. These pre-set macros can be in the form of a plurality of different questions pre-sent to different users such as: 1) time till arrival 2) reporting on whether another user leaves a particular geographic area such as the state, town or country; 3) reporting on the speed of another user; 4) reporting on whether another user has had an accident; 5) reporting on the conditions of the motor vehicle, wherein these conditions can include the heat of the engine, the gas mileage of the vehicle, the direction of the vehicle, etc. Next in step S5, the user can receive additional requested macros or shortcuts based upon customized macros created by the user. Next, in step S6, the user receives information requests. Next, in step S7 the user can provide additional information based upon information requests received. Next, in step S8 the system can relay information between at least two different participants. This information can be relayed based upon texted or verbal requests of the user to the database.

Finally in step S9 the system can learn through such mechanisms as artificial intelligence how to create additional macros or to automatically request additional information based on the information received and provided by participants.

Figure 2A:
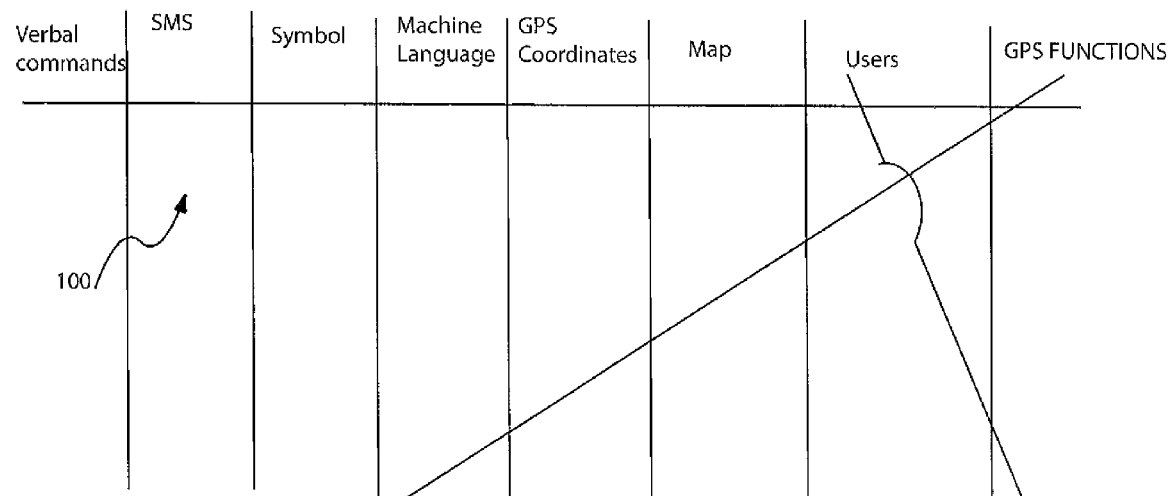
FIG. 2A is a first table for a database.
Figure 2B:
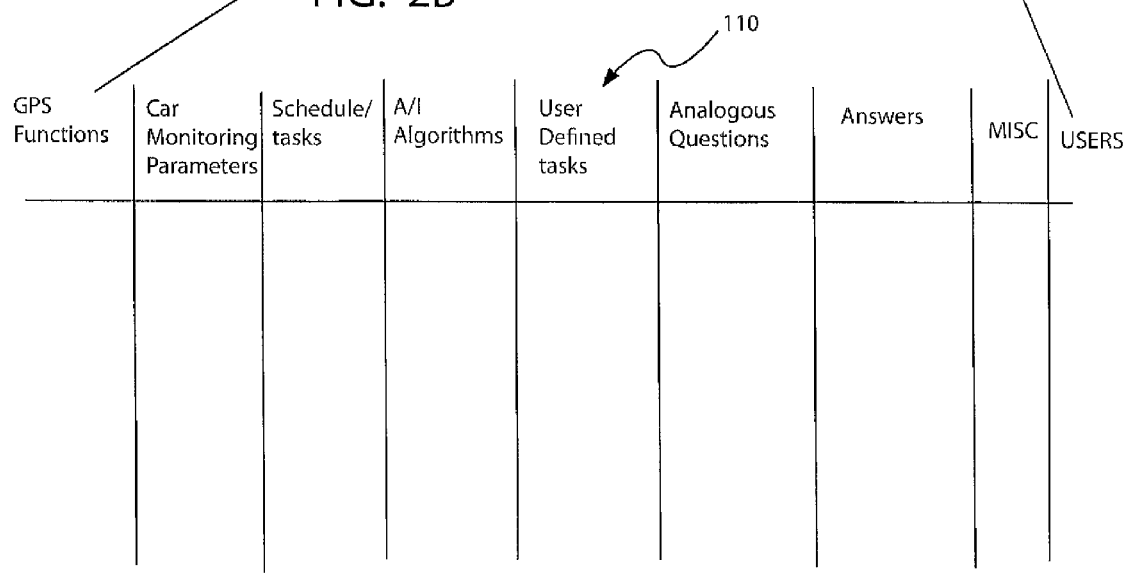
FIG. 2B is a second table for the database.

FIG. 2A discloses some of the tables that can be used in a database for use with the process shown in FIG. 1. For example, this table includes the following general subject areas: Verbal commands which are commands that a user can provide to the portable communication device 10 shown in FIG. 4. SMS which are texts provided to the portable communication device 10. Symbols, which are provided to the portable communication device, which can be in the form of shortcuts to obtain additional information. Other table content can include machine language, GPS coordinates, mapping information (See FIG. 3) and/or a list of users. Table 2B also includes additional subjects such as GPS functions, car monitoring parameters, schedule tasks, artificial intelligence algorithms which are configured in step S9 disclosed above, a series of user-defined tasks or additional macros, analogous questions which are a list of alternative questions to the typical questions that a user may ask, a list of pre-defined answers to these questions, and any other suitable heading for use in this system.

FIG. 3 shows the listing of the different headings for the map heading shown above. In this listing, there are the following general headings: graphical readouts of the maps, graphical readouts of the street names, graphical maps of states, graphical maps of countries, coordinates of towns, coordinates of villages, coordinates of countries, and coordinates of roads. Therefore, each of these geographical representations are configured to have pre-set boundaries defined on the GPS which are then translated into a text of these locations to a user.

Figure 4:
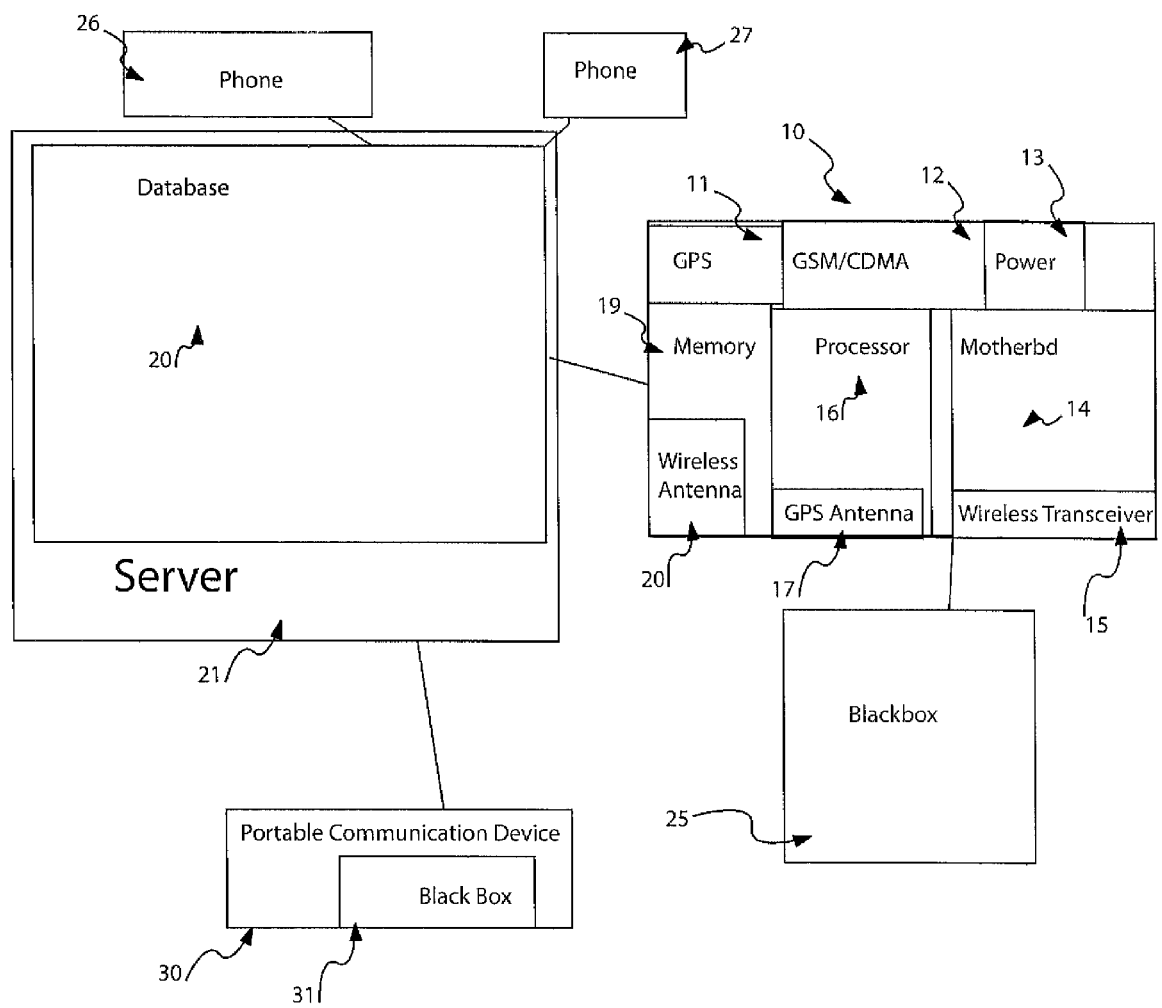
FIG. 4 is a schematic block diagram of the communication device.

FIG. 4 shows a schematic block diagram of the layout of the communication device 10 which can be used with the above flow chart or process and tables. For example, this portable communication device 10 can be installed on a vehicle such as a car, truck, van, etc., and include a GPS system 11 which is a global positioning system which is configured to be in communication with a global positioning satellite via a GPS antenna 17. This device can also include a GSM or CDMA SIM card which is configured to provide the device with a cellular telephone number and a means for communicating with database 20 which is stored on a remote server. The device 10 also includes a power supply 13, a motherboard, which house and connects all of these components, a wireless transceiver such as an 802.11 a, b, g, n etc. protocol wireless device and a processor 16, which can be in the form of a microprocessor which is configured to carry out a plurality of the steps shown in FIG. 1. The device also includes memory 19 such as a RAM or ROM or EEPROM or flash type memory. There is also a wireless antenna 20 which is configured to communicate with the remote server as well.

Database 20 can be stored on a remote server and be used to communicate with any one of additional phones 26 and 27 or black box 25 which is configured in a similar manner to portable communication device 10. This remote server can also be configured to communicate with a portable communication device 30 and black box 31as well.

Figure 5A:
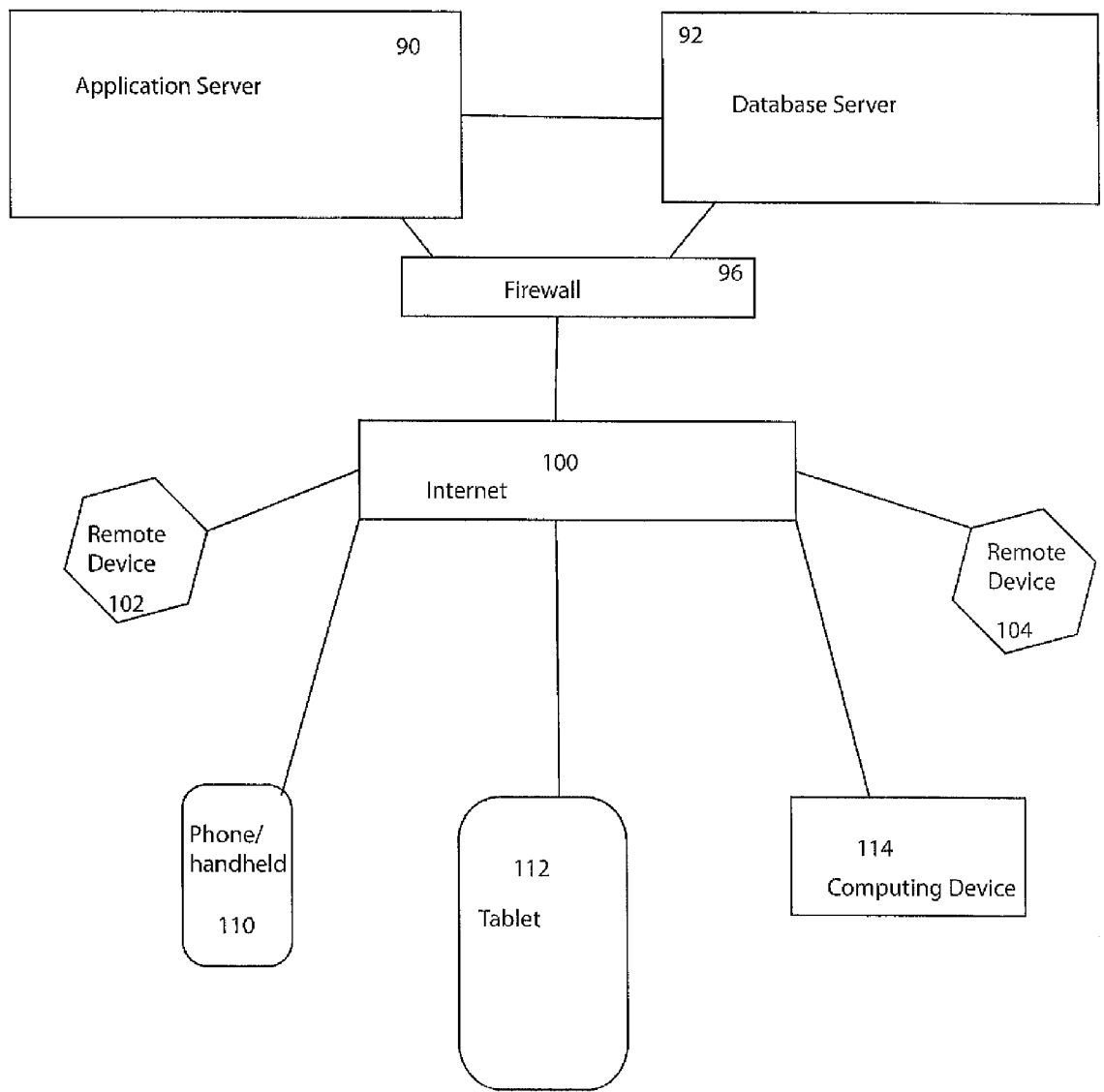
FIG. 5A is a block diagram of an alternative embodiment of a system associated with the invention.

FIG. 5A is a block diagram of an alternative embodiment of a system associated with the invention. For example, there is shown a computer network comprising the internet 100 which is coupled at one end to a firewall 96. Behind the firewall are at least one application server 90 and at least one database server 92. Alternatively both the application server and the database server can be housed in one device. The application server is configured to run the processes and features disclosed in FIGS. 7-14. The database server 92 is configured to house the data information which is used in the processes disclosed in FIGS. 7-14 as well. The electronic components associated with the database server 92 and the application server 90 are disclosed in FIGS. 6A.

In addition, there is also shown a plurality of remote devices 102 and 104. These remote devices can be in the form of communication devices which include communication elements which either alone or in combination with other components are configured to communicate through an interface such as a common gateway interface (CGI) with the communication server and the database server. Electronic components associated with this type device are shown in FIG. 6C.

In addition, in communication with the internet 100 are a plurality of different computing communication devices. These different computing communication devices can include but are not limited to a portable computing device such as a phone such as a cellular phone 110, a tablet computing device 112 or any other type of suitable computing device 114.

Figure 5B:
FIG. 5B is a list of database tables for use with the system.

FIG. 5B shows a series of databases/tables that can be stored in database server 92. For example, there can be a database table/database 92a which stores information about the object's personality profile. This object's personality profile can be constructed from some of the other databases/tables listed herein. For example, database/table 92b includes current and/or past location, travel and/or movement history of the object. Database/table 92c includes current and /or past associations of the object with other enrolled objects. Database/table 92d includes current and/or past activities of the object. Database/table 92e includes future likely movements of the object. Database/table 92f includes future likely activities of the object. Database/table 92g includes future likely associations of the object. Database table 92h includes the current mood of the object. Database/table 92i includes the horoscope of the object. Database/table 92j includes personality type of the object. Database/table 92k includes the demographic information about the object. Database 92l includes weather information, while database 92m includes a list of living users who may be associated with the object. Database 92n includes a listing of building opening and closing times, or park opening and closing times or event start times as well. Thus, a user travelling to this destination can determine whether they will arrive at this destination during the hours that the building is open, the park is open or during the hours of an event. This occurs by microprocessor 121 determining the location of the object, the distance the object is from the desired location, the time of day, the expected arrival time as well as comparing this information to the information in database 92n which includes the opening and closing times for the building, the park or the start and end times for the event.

Database 92o can also include traffic information as well, while, database 92p can include the speed of the object, the temperature of the object, or additional information regarding the state of any other object that is coupled to this object so that the system can use database table 92b for location, and database table 92o, and database/table 92p to determine the time for arrival of the object at a location. In this case the object can be in the form of remote device 102 or remote device 104.

Figure 8:
FIG. 8 is a graphic representation of a screen for a personality profile for an object.

With all of this information stored in these databases/tables a personality profile can be constructed in table/database 92a, such that this information creating a personality profile can then be viewed online such as through graphical representation 200 shown in FIG. 8.

Figure 6A:
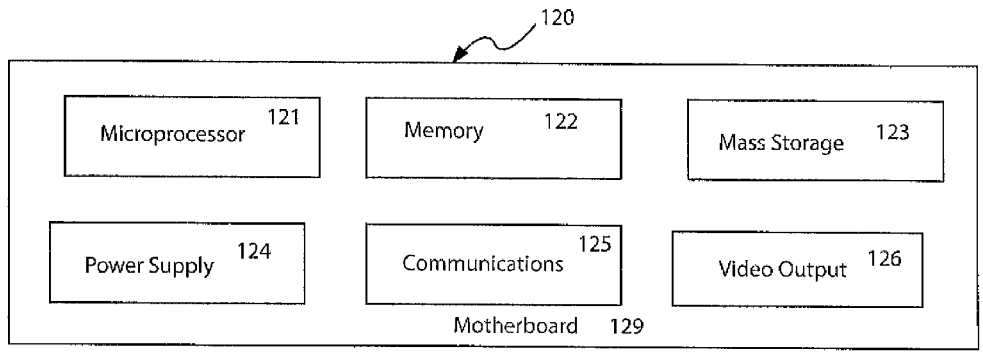
FIG. 6A is a block diagram of the components of a server of the embodiment of FIG. 5.

FIG. 6A is a block diagram of the components of any of the servers 90 and 92 of the embodiment of FIG. 5. For example, there is shown a microprocessor 121, memory 122, a mass storage 123, a power supply 124, a communications device 125, and a video output 126. Microprocessor 121 is configured to run the program associated with the process shown in FIGS. 7-14. Memory 122 is a RAM type flash memory which is used to upload the program associated with the process shown in FIGS. 7-14 so that microprocessor 121 can access the set of instructions in memory and carry out or perform these sets of instructions. Thus, microprocessor 121 is configured to perform the steps or features outlined in FIGS. 7-14. Mass storage 123 is configured to allow the program to reside in its memory banks. With instructions from microprocessor 121, the information from mass storage 123 can be loaded into memory 122 such that microprocessor 121 can perform the steps in a RAM type memory. RAM memory 122 can be any type of suitable flash or EEPROM type memory. Mass storage 123 can be any type of suitable mass storage device, such as solid state memory or older style platter based hard drives.

These components are powered by a power supply 124 and can communicate to outside components via a communications module 125. Communications module is configured to communicate via any suitable protocol such as but not limited to TCP/IP. There is also a connection and hardware to output video via video output 126. All of these components can be coupled together such that they receive power from power supply via motherboard 129. In addition, all of these components can communicate with each other through communication lines on motherboard 129 as well.

Figure 6B:
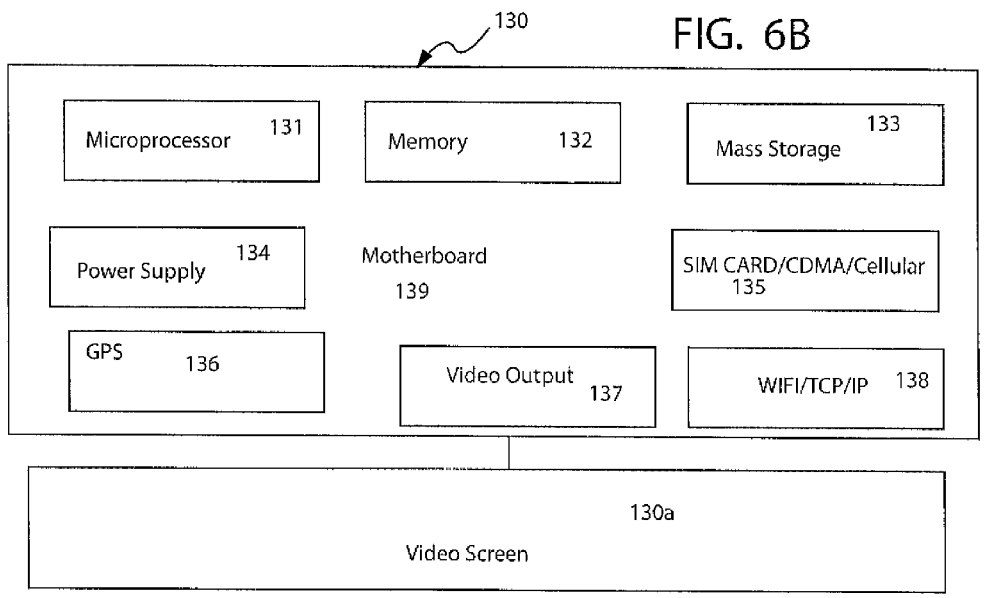
FIG. 6B is a block diagram of the components of an electronic device of the embodiment of FIG. 5.
Figure 6C:
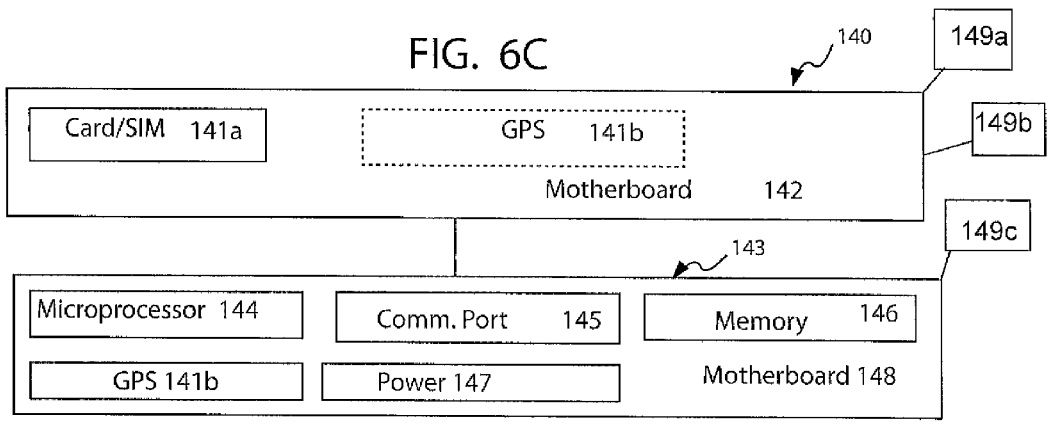
FIG. 6C is a block diagram of the components of an object.

FIG. 6B relates to the electronic components that are associated with the portable computing devices such as the phone 110, the tablet 112 or the stationary or portable computing device 114. These components 130 include a microprocessor 131, a memory 132, a mass storage 133, a power supply 134, a communications/identification card 135, a GPS 136, a video output controller 137, and a WIFI or other type of communications controller/ card 138. All of these components are coupled to motherboard 139 and can communicate power as well as information with each other through motherboard 139. In addition, coupled to motherboard 139 is a video screen 130a which allows for a readout of information which may be stored on servers 90 and 92 which detail information about remote devices 102 and/or 104.

FIG. 6C shows a simplified electronic diagram of an identity device 140 which relates to the remote devices 102 and 104. These remote devices 102 and 104 can be plugged into other types of devices so they include a simplified design. With this design, there is shown a motherboard 142 as well as a communications card such as a SIM or GPRS type card 141a and a separate GPS card 141b. Thus, the device can communicate positioning information wirelessly to other users via the communications card 141a. The communications device 141a can include an onboard memory to record the GPS locations as well as This type of device can be coupled to another device 143 which includes a microprocessor 144, a communications port 145, a memory 146, and a GPS 141b. The board can have GPS installed thereon instead of being installed on the identity device/component 140. There is also a power supply or an adapter to receive power from another component 147. All of these components are installed on a motherboard 148 such that the motherboard 148 allows for communication of information/instructions between the components as well as power. This type of component can also have an output to a screen as was shown in FIG. 6B. The communications port 145 allows this device to communicate with identity device 140 as well as with other components, such as but not limited to an automobile. Thus, the communication with the automobile allows for automobile information such as operating temperature, inside temperature, outside temperature, revolutions per minute (RPM) of the engine, mileage of the auto, braking of the auto, fuel efficiency such as miles or kilometers per gallon or liter of fuel, oil life of the auto, fuel left in the auto, components used such as radio, heater, seat movement, window movement, etc.

This device can be configured so that it can be coupled to any one of a plurality of outside or external sensors. An "outside" or external sensor is one that is outside of the proprietary or standard components of an object that the identity/device component is coupled to, such as automobile components. These sensors can include any one of but are not limited to a temperature sensor for an automobile engine which can be installed as an aftermarket part, an external outside temperature sensor, a noise sensor, an automobile diagnostic sensor, an oil pressure gauge, a fuel gauge or any other type of sensor that is normally transmitted through automobile diagnostics.

For example, an external temperature sensor could be an aftermarket part that can be mounted on an automobile engine and kept separate from an automobile's standard diagnostic tools. In addition, microprocessor 144 can be configured to upload or pull this information from the external sensors 149a, 149b, and 149c or from an onboard diagnostic automobile device and store this information in memory 146 so that this memory 146 can form a "black box" for an automobile, recording all of the movements of this automobile as well as locations of this automobile. This information can also then be relayed up to the servers such as servers 90 and 92.

Figure 7:
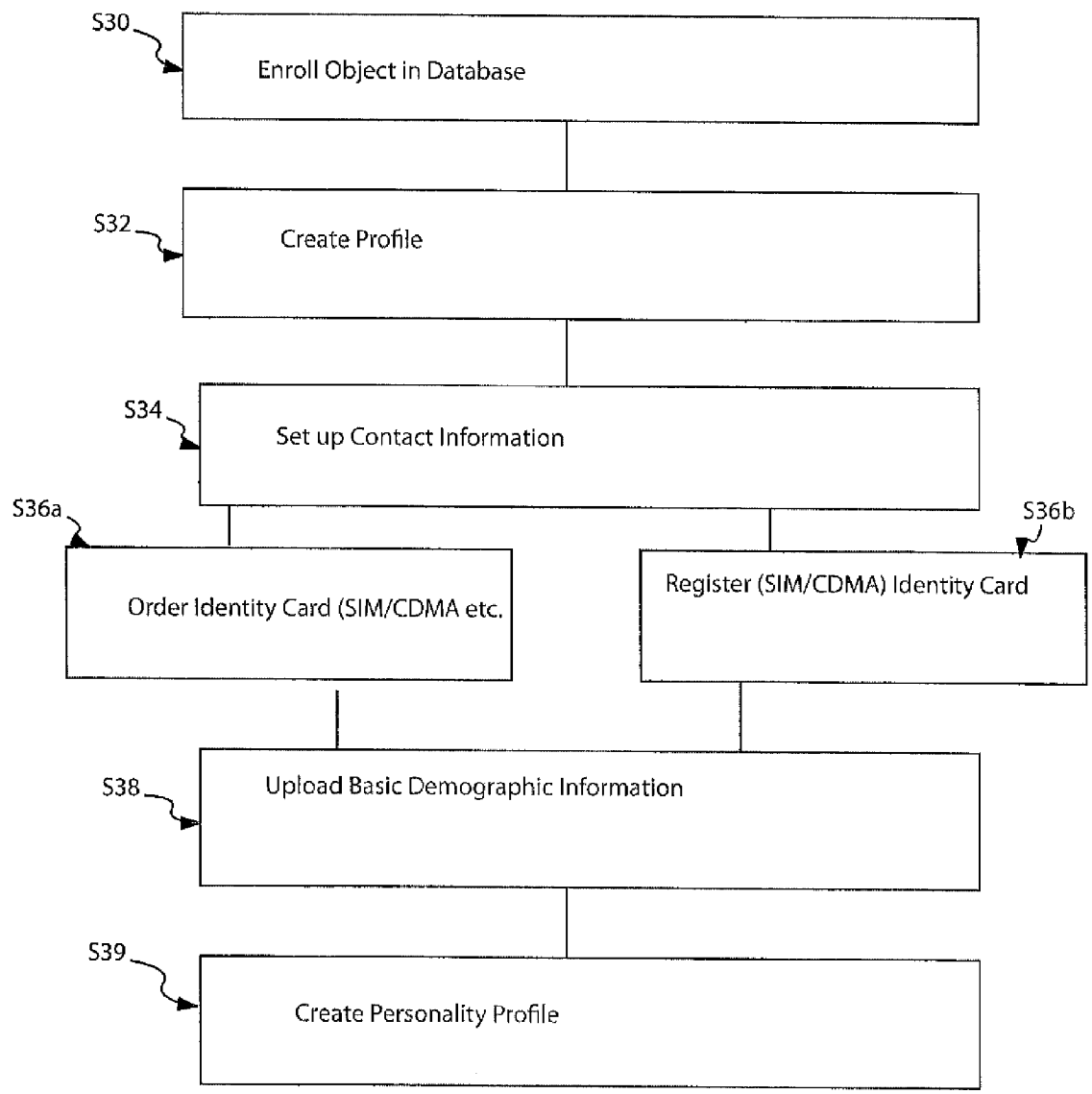
FIG. 7 is a flow chart showing a third embodiment which is a process for enrolling an object and creating a profile.

With this second embodiment, as shown in FIG. 7, the system starts in step S30 where the user can enroll objects such as remote devices 102 or 104 in the database. The enrollment of an object in a database can include the user signing up for a profile, as well as identifying the object itself. For example, in step S32 the user can create a profile for an object. The profile can include information which includes contact information, identity card information, demographic information, as well as a personality profile.

For example in step S34 the user can set up contact information for this object. Contact information can include telephone number, email address, twitter contact, or any other type of contact information.

Steps S36a and S36b include either a user ordering an identity card such as a SIM card/CDMA card which comes provided with a telephone number or registering an existing SIM card/ CDMA card to either register an existing telephone number or to receive a new telephone number.

Next, in step S38 the user can upload basic demographic information about the object. This type of demographic information is discussed in greater detail in FIG. 9. Next, in step S39 user can create a personality profile as well. This personality profile is shown in FIG. 8 as well as discussed in greater detail in FIG. 11.

These above steps can be performed via a user login through the Internet 100 via any one of devices 110, 112, or 114, and communicating with a server such as application server 90 and database server 92. Communication of this information can be through a web portal such as a webpage which can be generated by application server 90 wherein microprocessor 121 is configured to perform the steps shown in FIG. 7.

FIG. 8 discloses screenshot of a profile created by user, such a profile can be created for example in step S32. The screenshot 200 is a representative example of a profile created by a user for an object. For example, included in this profile could be a picture 202, demographic information 204, contact information 206, as well as a personality profile 208. In addition, this profile could also include a list of future acts 210 that could be or may be performed by the object shown in profile 200. This type of object could be any type of suitable object but for example could be an object associated with anyone of remote device 102 or remote device 104.

Figure 9:
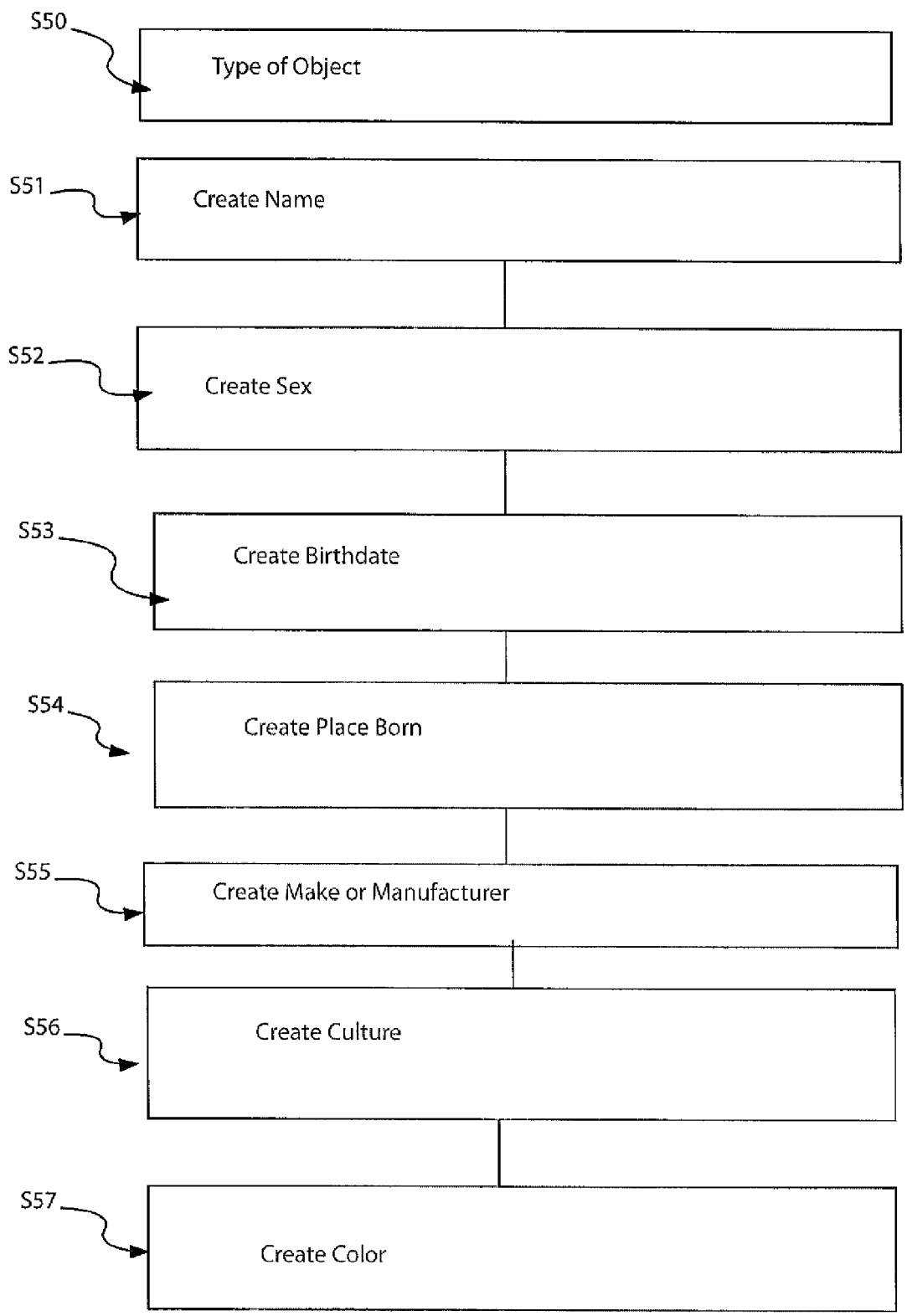
FIG. 9 is a flow chart for creating demographic information for the object.

FIG. 9 discloses a flowchart for creating a demographic profile for an object. This demographic profile can be created using application server 90 as well as storing information in database server 92. Steps S50-S57 can be performed using microprocessor 121. For example, a user login to application server 90 can enter in the type of the object in step S50. This object could be an identification card or chip such as remote device 102 or remote device 104. This remote device can also be associated with another type of an object such as an automobile, telephone, a computer, an animal collar, such that the remote device 102 and 104 associated with application server 90 and database server 92 can create a personality and an occasions profile for objects which previously did not have any ability to communicate, or have a personality profile as well. Thus, for example the user could input the type of object in step S50. Next, and step S51 the user could create a name for that object. For example, a user could enter in the name of the car such as "Nigel". In step S52, the user could associate a sex with that object such as male or female. Next, in step S53 the user can associate a birthday such as the date of the creation or purchase of the automobile. Next, in step S54 the user can associate a place where the object was born or created. This could be for example, Detroit, Mich., Stuttgart, Germany, Palo Alto, Calif., New York, N.Y. or Sofia, Bulgaria. The user can also insert in step S55 the make or manufacturer of the object. Next in step S56 the user could add a culture associated with the object. For example, even if the object is manufactured in one location such as Mexico or China, if the object is traditionally associated with German culture, then the user could associate this object with German culture, even though it was manufactured in a different location. Next in step S57, the user can associate a color with this object as well. All the steps can be performed via a user logging into either application server 90 and or database server 92 inputting information into a webpage through Internet 100 via any one of devices 110, 112, and/or 114.

Figure 10:
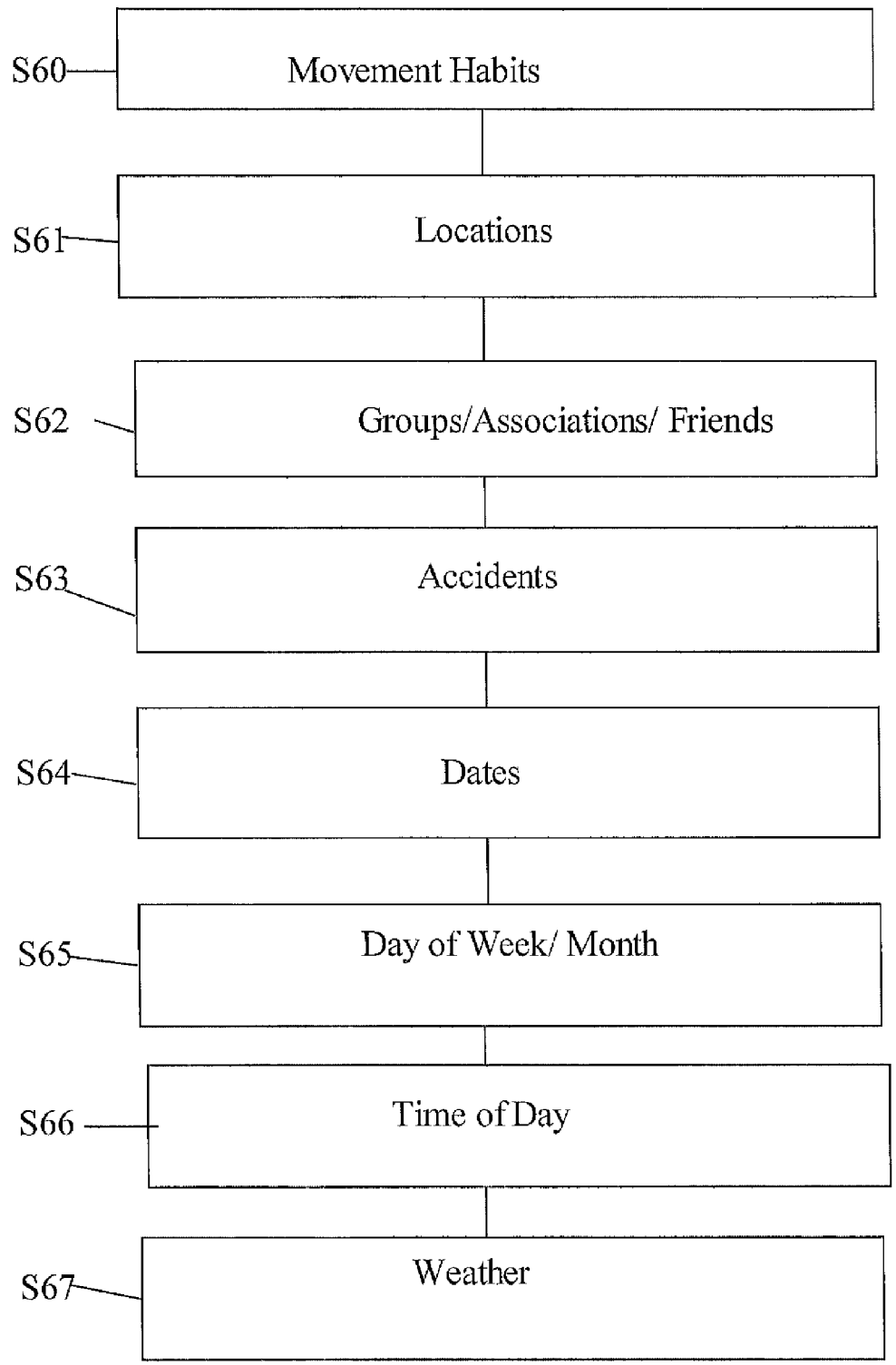
FIG. 10 is a flow chart for determining the past acts of an object.

FIG. 10 is a flowchart for the determination of past acts of the object. For example, the user could input information about the object including its movement habits, its destinations, locations, associations, any accidents, and associate all this information with days of the week as well as exact dates as well as time of the day or the weather. This information can be input by a user using any devices such as 110, 112, or 114 or inputting information via communication through the Internet 100 into a webpage to communicate information to application server 90 and/or database server 92. This information can also be automatically relayed from any one of remote device 102 or remote device 104 communicating through Internet 100 into application server 90 or database server 92.

For example, in step S60 the user could input the movement habits of the object. These movement habits could include any movement up or down left or right backwards or forwards, the style of movement habits whether it's smooth, erratic, fast, slow, or any other type of movement habits.

Along with the tracking of movement habits, the locations that this object moves to can also be tracked in step S61. Thus, this system can track any location that the object arrived at, either via GPS coordinates, location information, or any other related data. In step S62, this system can also determine whether other objects enrolled in the system are consistently located nearby. For example, in step S62 the system can identify groups or associations of friends of different objects, if they consistently appeared to be in a similar or same location. For example, if two friends who either both own telephones, or automobiles, travel consistently together, the system can identify that these two objects are usually located in a same or similar location. This then allows the system to determine whether these users are likely friends, family members, or associates.

Next, in step S63 the system can determine whether an accident has occurred. The determination of whether an accident has occurred can occur by tracking sudden stopping or sudden movements of, for example an automobile, a telephone, or any other objects, that are being tracked. Additional information related to an accident could also be uploaded by the remote device 102 or 104 or by the connection with an onboard vehicle "black box". Thus, information from the black box in the automobile can be communicated to either one of remote devices 102 or 104 which then communicates through the internet to application server 90 which then communicates this information in the database server 92. Thus, processor 141 reads this black box information, forces black box information through the internet to application server 90, wherein application server 90 using microprocessor 121 analyzes this information and then stores this information database server 92.

Next, the system can also track the dates of these activities in step S64. For example, the system can keep a database in database server 92 of all the dates of these activities which tracks the movement habits, locations, the groups Association or friends, or any accidents for these activities. This information can also in step S65 correlate these activities based upon a day of the week or a day of the month, or a day at of the year. In addition, this time database in step S66 can also track the time of day that these activities occur. Furthermore, this database can also track in step S67 the weather that is associated with some of these activities. For example, if a user is traveling to a beach on a hot July day, the system would store information about the location of travel of the object, draw in weather information associated with the time and date of that trip, record the movement habits during this time, record the groups/associations/friends that also perform these trips as well. Therefore, the system can create a movement or travel profile for an object. While all the information from steps S60 through step S66 can be communicated from remote objects 102 and 104, information about the weather must be drawn from other sources such as generally recognized internet databases associated with weather information. This information can be downloaded via a command sent from application server 90 and then this information can then be stored in database server 92 to help create a travel profile for this object.

Figure 11:
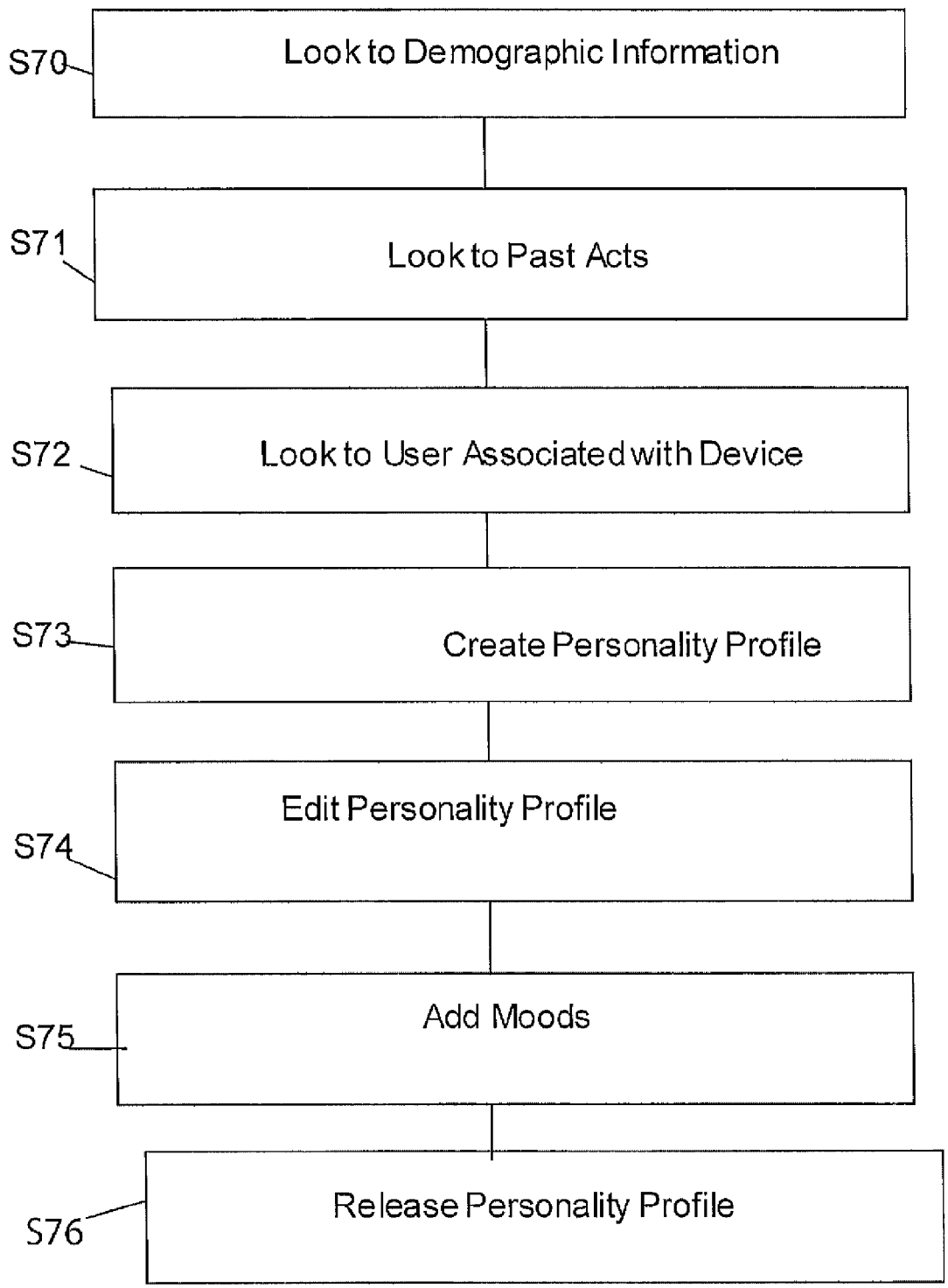
FIG. 11 is a flow chart for creating a personality profile for an object.

FIG. 11 is a flowchart disclosing the process for creating a personality profile for the object. For example, step S70 includes the system looking into the demographic information of the object. Next step S71 looks at the past acts, wherein these past acts were described in FIG. 10. Next, step S72 involves the system looking to the user who is associated with the device. For example, when a user registers or enrolls an object in the database as indicated in step S30 the personality of the object, as well as a personality the user can be used in combination to create an overall personality profile. Actions taken by an object when controlled by one user may be entirely different from actions taken by the object when controlled by different user. Once all this information is stored in database server 92, application server 90 can then create in step S73 a personality profile. Next, application server 90 can present this personality profile to a user on a screen in step S74 to allow the user to edit the personality profile. When editing a personality profile, user can add in step S75 moods of the object as well as change any other information about the object. Next, in step S76 the system releases the personality profile so that other users can view this personality profile on the screen. This is shown by way of example of personality profile 200 shown in FIG. 8.

Figure 12:
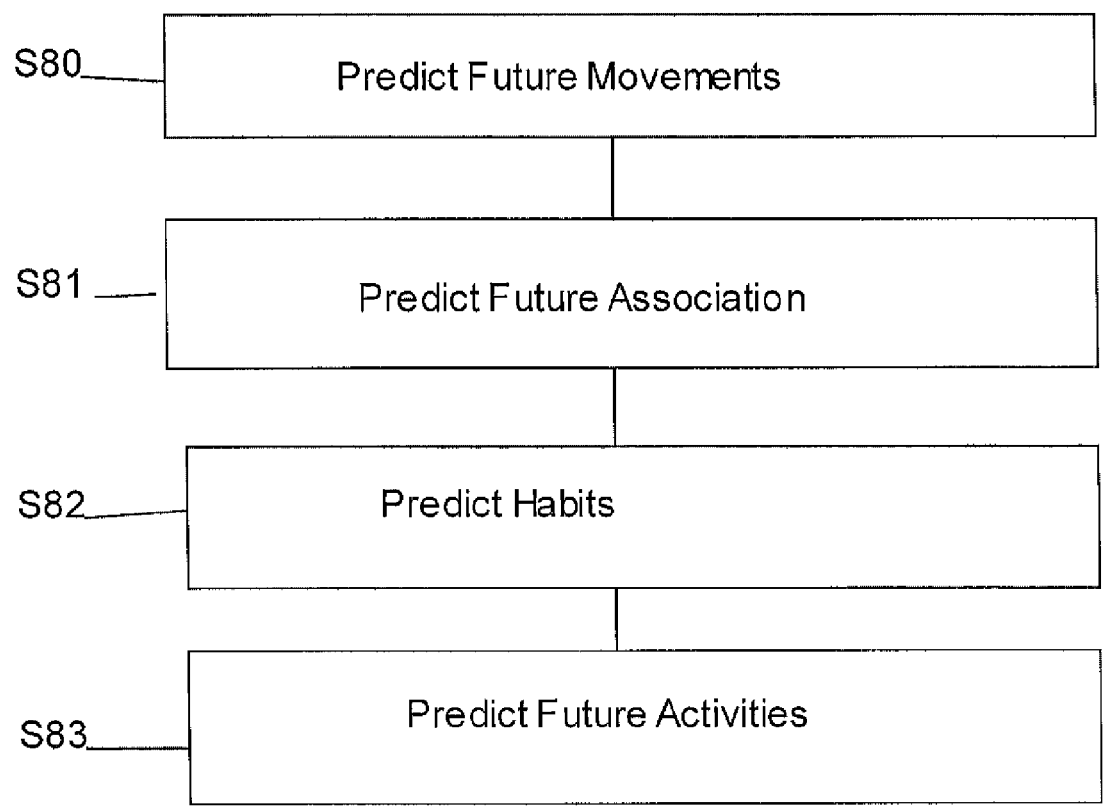
FIG. 12 is a flow chart used for predicting future acts of the object.
Figure 13:
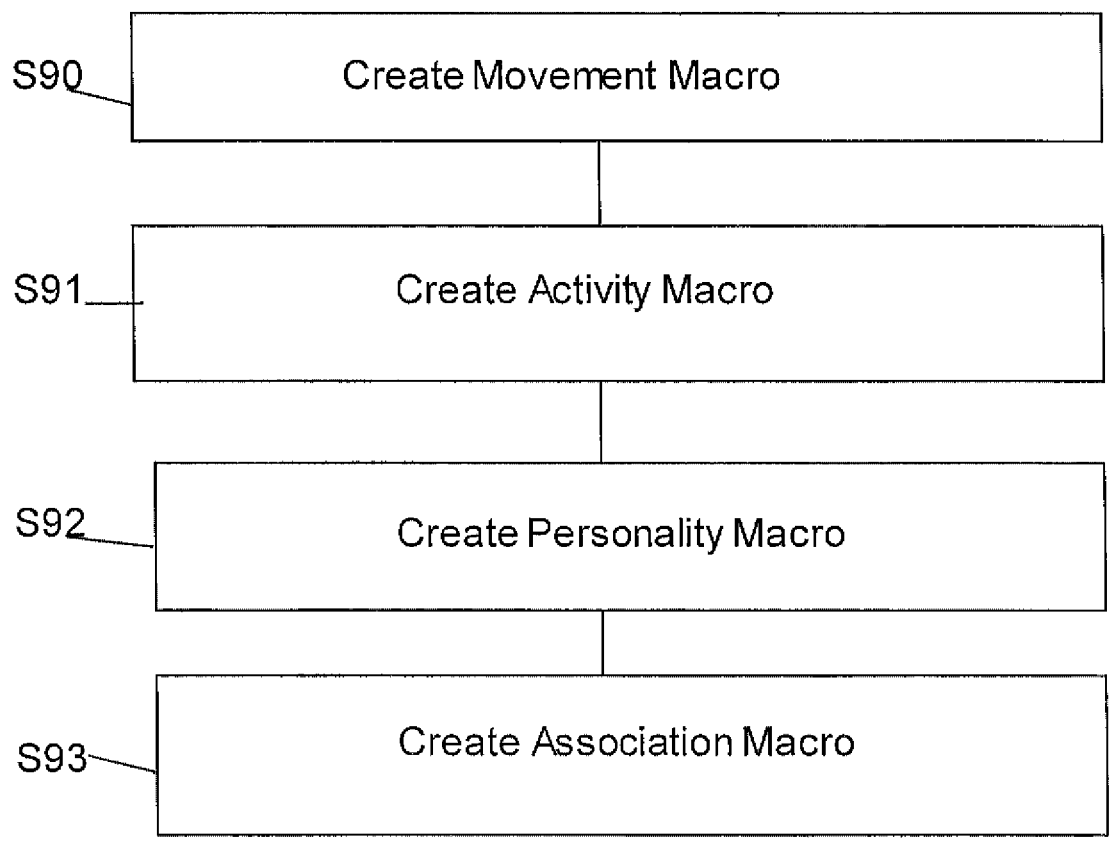
FIG. 13 is a flow chart for creating macros for allowing users to query information about the object.

Next, the system as shown in FIG. 12 can use this information associated with different databases or a single database and database server 92 to predict future actions or movements of an object. For example in step S80 the system can predict future movements of the object. These future movements can be associated with both the movement habits of step S60 as well as the locations that the object visits associated with step S61. In addition, the system can predict future associations or meetings with other objects that are enrolled in the system in step S81. Next, in step S82 the system can predict future habits of the object, and in step S83 the system can predict future activities of the object. These activities can include for example, whether the user turns on a radio, how loud the user is, how active the user is, whether the user of the car turns on the air conditioning, the heat, rolls down the windows, turns up the stereo, uses a navigation system, buckles their seat belt, etc.

Next, the system can also create a series of different macro subsystems that can have pre-set answers to common questions presented to the object. For example, the system can create a movement macro in step S90. A movement macro is one which predicts certain actions based upon past actions associated with movement habits and location movements of steps S61 and S62. Next, the system can create an activity macro which includes both the past acts and activities of the user, as well as future expected activity movements such as that shown in step S83. Next, the system can create a personality macro in step S92 based on predicted habits that sets a series of pre-set answers to common questions based upon personality profile created for the object as well. Next, in step S93 the system can create an association macro which sets pre-set answers associated with questions relating to other objects based upon one particular object that may be closely associated with another object or other objects, via travel or activities.

Figure 14:
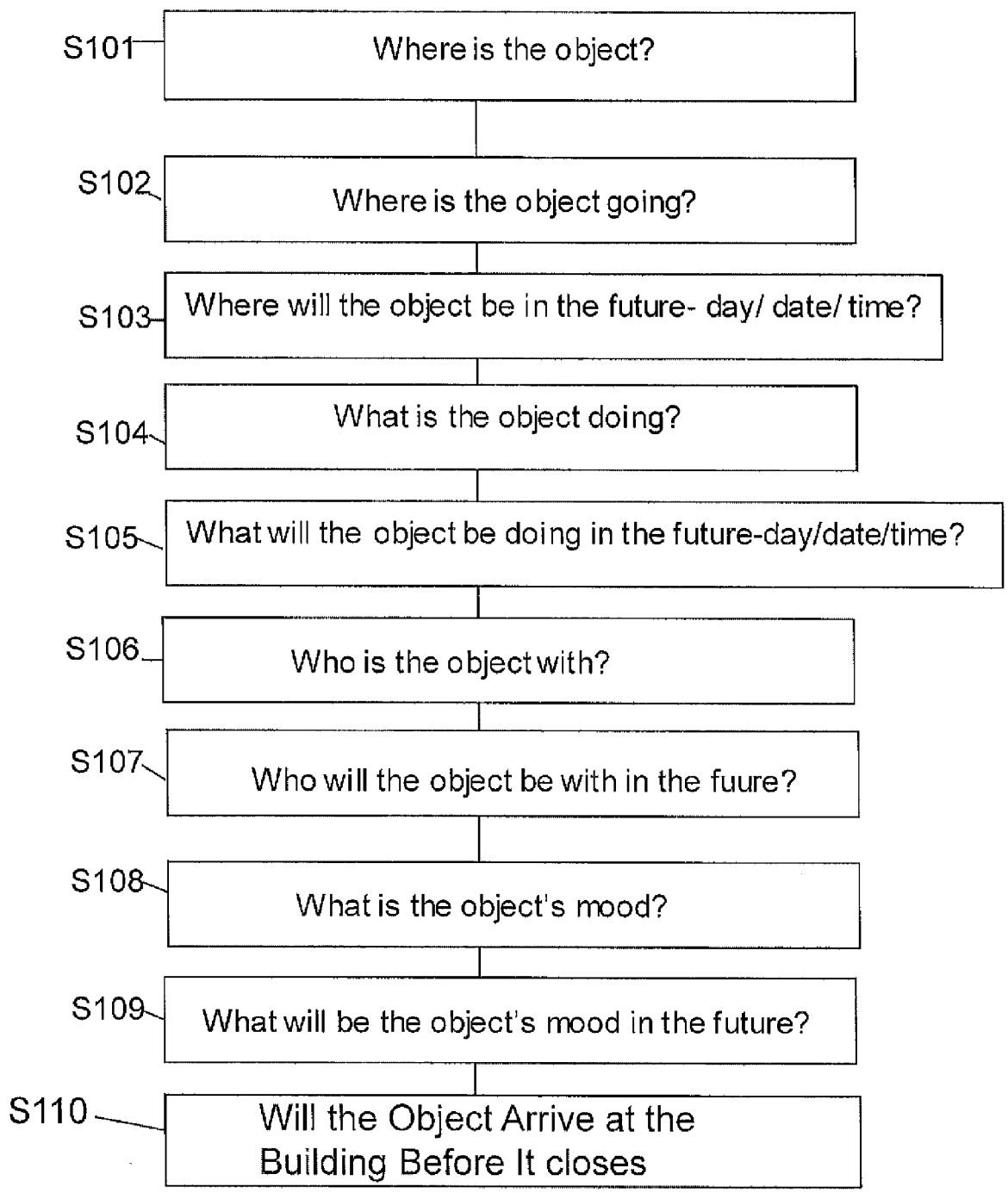
FIG. 14 is a flow chart showing the types of queries that can be presented for an automated response.

FIG. 14 is a flow chart showing the types of queries that can be pre-set for an automated response. In all, the device is configured to communicate with other portable communication devices such that users can obtain information from vehicles, such as motor vehicles, so that these users can determine not only the location of these vehicles but also the condition of these vehicles as well as their destination, their travel routes as well as their time for arrival.

For example, the pre-set macros which can be used to question or query parameters about an object include in step S101 querying "where is the object?". In step S102 a user can have a macro to query "where is the object going?". The system can rely on past movement data to answer this questions based upon the microprocessor 121 correlating past travel information with the user, the personality of the object along with the day/date/time of day of the query.

In step S103, a user can have a macro to query "Where will the object be in the future-depending on the day, date, or time of day or time of year? In step S104 the user can have a macro to query "what is the object doing?". This would likely return an answer based upon the geographic location of the object, the time of year, the time of day, and the user. For example, if the location was a beach, the time of day was 12:00 noon and the user was a beach lover, then the system would return the answer "I am at the beach, enjoying the sun". Alternatively if the object was associated with a user who was a known fishing enthusiast and the object was at the beach at night during the fall, then the system could return the answer "I am surfcasting at night".

In step S105 the system can also provide future information about the likely habits of the object, particularly what the object will be doing in the future. This information can be obtained by determining the past habits of the object based upon the context of these acts, including the time of day, the day of the week, or the date on a calendar. Next, in step S106 the system can have a pre-set query for "who is the object with?". The information to answer this query is obtained by the microprocessor 121 correlating the geographic information of all of the enrolled objects and selecting the closest relevant objects to answer the above question. Next, in step S107 the system can provide the following macro for a query "Who will the object be with in the future?". The microprocessor 121 can then determine the location of the object, the time of day of the query, the day of the week, the date on the calendar, the direction the object is traveling, to determine the likely future association of the object with another enrolled object.

Next in step S108 the system can provide an automatic macro for the query "what is the object's mood?" The answer to this question is provided by the system wherein the microprocessor 121 determines the objects mood based upon the time of day, day of the week, the calendar date, day of the month, the current activity of the object, as well as any recent accident history or horoscope information.

Next, in step 109 the system can provide an automatic macro for the query "what will the objects mood be in the future?". The answer to this question is provided by the system wherein the microprocessor 121 determines the object's future mood based upon the time of day, day of the week, the calendar date, the current activity of the object, the future activities of the object, the current location of the object, the future location of the object, any recent accident history, as well as any horoscope information as well. Finally, in step 110 the system can provide an automatic macro for the query "will the object arrive at the building before it closes?". With this macro, a user can determine whether the object will arrive at the destination within a desired time range or time period. To determine the answer for this macro, microprocessor 121 refers to database 92n to determine the time period. In addition, it refers to database 92p to determine the estimated time for arrival of the object. The "object" in this instance can be in the form of remote device 102 or remote device 104 and which is shown by way of example in FIG. 6C.

Thus, this system creates a way for different objects to communicate with each other. Each of these objects, whether controlled by a human or not can be assigned essentially a personality and personal characteristics which allow this object to have pre-defined answers to typical daily questions. By applying a personality and characteristics to an otherwise non-living object such as remote device 102 or remote device 104, and shown by way of example as object 140, this allows users to speak with these non-living objects and to even carry on a conversation with these non-living objects while at the same time being able to extract valuable information from this object such as location, association, speed, direction, and other relevant conditions or characteristics.

Accordingly, while at least one embodiment of the present invention has been shown and described, it is to be understood that many changes and modifications may be made thereunto without departing from the spirit and scope of the invention as defined in the appended claims.

What is claimed is:

1. A computerized process for communicating comprising the following steps:
    a) enrolling at least one object in a communication system;
    b) providing contact information for said at least one object by uploading said contact information into at least one database;
    c) obtaining a set of past history information of said at least one object by uploading data from said at least one object into said at least one database; and
    d) obtaining demographic information about said at least one owner of said at least one object and storing said demographic information in said at least one database;
    e) creating a personality profile based upon said past history of said at least one owner of said at least one object; and
    f) providing a personality profile for said at least one owner of said at least one object and presenting said at least one personality profile on a screen for viewing and for communication therewith;
    g) contacting the object; and
    h) using a microprocessor to answer a question provided to the object based upon at least one of said contact information, said past history information, said demographic information, and said personality profile; and
    i) communicating between at least two objects GPS location information to provide a location for each of said at least two objects.

2. The process as in claim 1, wherein said step of enrolling an object in a communication system comprises providing at least one web page to at least one user to enroll at least one non-living object in a communication system.

3. The process as in claim 1, wherein said step of providing contact information for said at least one object comprises providing at least one contact element comprising at least one of a: telephone number, an email address and an address for a non-living object.

4. The process as in claim 1, wherein said step of providing contact information for said at least one object comprises providing a web address for said at least one object.

5. The process as in claim 1, wherein said step of obtaining a past history of said object comprises uploading into said database past travel information of said object, past movement information of said object, past association information about said object, past accident information about said object.

6. The process as in claim 5, wherein said step of obtaining past history of said object comprises using said microprocessor to correlate said past travel information, said past movement information, said past association information, said past accident information with at least one day of a week, and at least one date.

7. The process as in claim 6, further comprising the step of predicting future movements of said object based upon said past travel information and current weather information.

8. The process as in claim 7, further comprising the step of predicting future association of said object with other objects by using said microprocessor to correlate past travel information of a first object in said database, with past travel information of a second object in said database.

9. The process as in claim 8, further comprising the step of uploading into said database a mood for said object.

10. The process as in claim 6, further comprising the step of using said microprocessor to perform a step of creating a plurality of macros comprising pre-set answers for said object based upon movement information of said object and current weather information and storing said plurality of macros in said database.

11. The process as in claim 6, further comprising the step of using said microprocessor to perform a step of creating a plurality of macros comprising pre-set answers for said object based upon activity information of said object and storing said plurality of macros in said database.

12. The process as in claim 6, further comprising the step of using said microprocessor to perform a step of creating a plurality of association macros comprising pre-set answers for said object based upon past association of said object with other objects and storing said plurality of macros in said database.

13. A system for communicating with an automobile comprising:
    a) at least one communication module;
    b) at least one external sensor in communication with said at least one communication module, said at least one external sensor comprising at least one of: a temperature sensor, a fuel gauge, a noise sensor, wherein said at least one sensor is configured to communicate sensor information to said at least one communication module, and wherein said at least one communication module is configured to communicate wirelessly to convey information received by said at least one external sensor;
    at least one server having at least one database which is configured to store personal demographic information about at least one owner of the automobile.

14. The system as in claim 13, further comprising at least one microprocessor coupled to said at least one communication module and to said at least one external sensor, wherein said at least one microprocessor is configured to read signals from said at least one sensor and to relay said signals to said at least one communication module.

15. The system as in claim 14, further comprising at least one communication port configured to connect to a communication port of an automobile to read information presented by the automobile.

16. The system as in claim 15, wherein said at least one communication module comprises at least one a SIM card or GPRS card.

17. The system as in claim 13, further comprising at least one GPS card configured to communicate with at least one GPS location device.

18. The system as in claim 13, wherein said at least one external sensor is external to any of the automobiles standard components.

19. A computerized device for communicating with at least one object comprising the following steps:
    a) means for enrolling at least one object in a communication system;
    b) means for providing contact information for said at least one object by uploading said contact information into at least one database;
    c) means for obtaining a set of past history information of said at least one object by uploading data from said at least one object into said at least one database; and
    d) means for obtaining demographic information about said at least one object and storing said demographic information in said at least one database;

e) means for creating a personality profile based upon said past history of said at least one object; and
f) means for providing a personality profile for said at least one object and presenting said at least one personality profile on a screen for viewing and for communication therewith;
g) means for contacting the object; and
h) using a microprocessor configured to answer a question provided to the object based upon at least one of said contact information, said past history information, said demographic information, and said personality profile; and
i) means for communicating between at least two objects GPS location information to provide a location for each of said at least two objects.

20. The computerized device as in claim 19, wherein said means for enrolling at least one object in a communication system comprises presenting a web page via at least one computerized server onto a screen and providing at least one database for receiving information from said screen, and
wherein said means for providing contact information for said at least one object by uploading said contact information into at least one database, comprises providing at least one web page configured to allow the uploading of contact information into said at least one database.

21. The process as in claim 1, wherein said step of obtaining demographic information of at least one owner comprises obtaining demographic information of a plurality of owners of said object to form a personality profile for said object.

* * * * *